C. H. THORDARSON.
HIGH POTENTIAL ALTERNATING CURRENT RECTIFIER.
APPLICATION FILED DEC. 7, 1908.
950,124.
Patented Feb. 22, 1910.
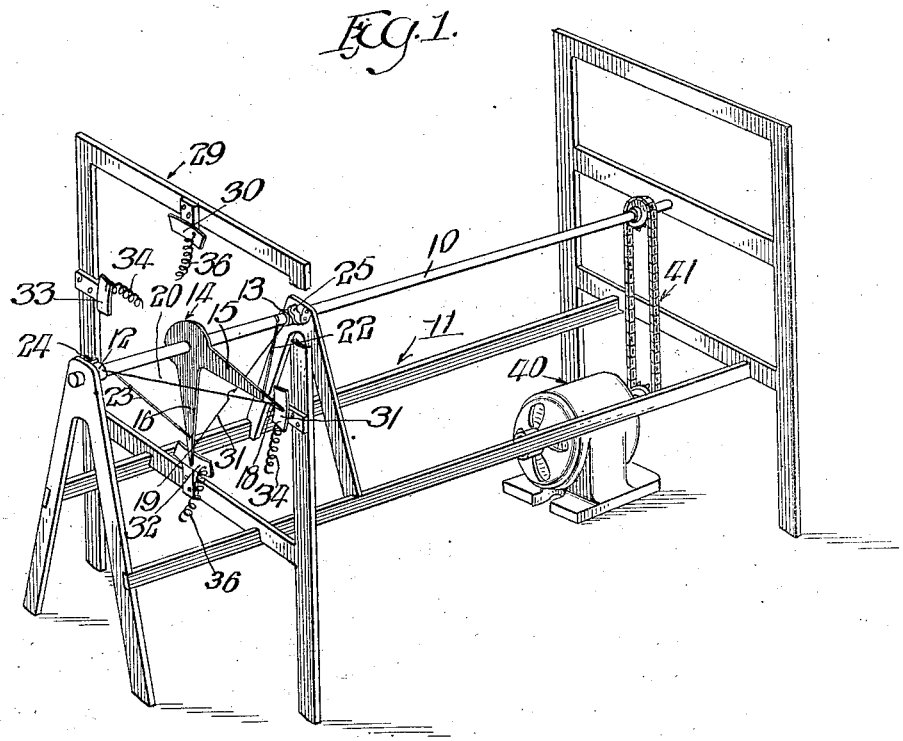
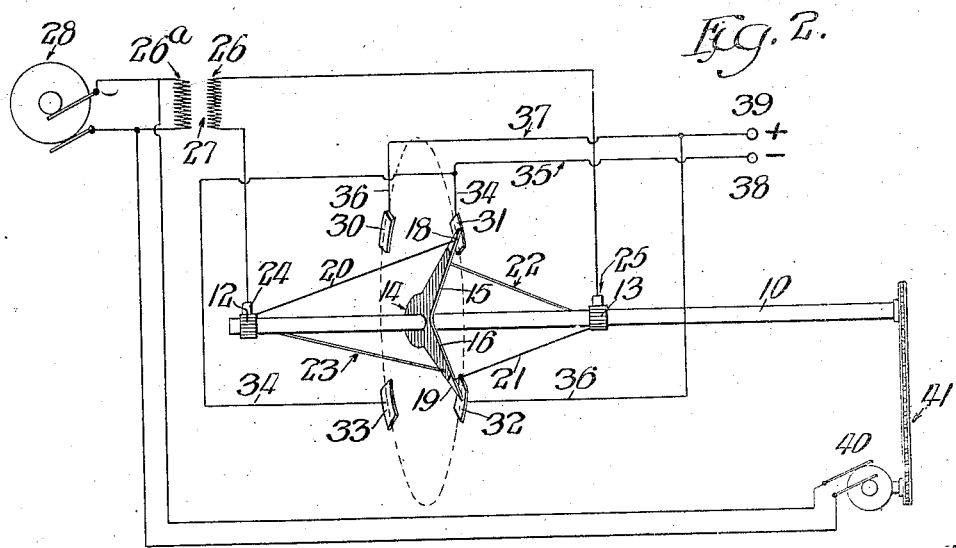
Witnesses:
Inventor.
Chester H. Thordarson
by Attys

UNITED STATES PATENT OFFICE.

CHESTER H. THORDARSON, OF CHICAGO, ILLINOIS.

HIGH-POTENTIAL-ALTERNATING-CURRENT RECTIFIER.

950,124. Specification of Letters Patent. Patented Feb. 22, 1910.

Application filed December 7, 1908. Serial No. 466,212.

*To all whom it may concern:*

Be it known that I, CHESTER H. THORDARSON, a citizen of the United States, and a resident of Chicago, in the county of Cook and State of Illinois, have invented certain new and useful Improvements in High-Potential-Alternating-Current Rectifiers; and I do hereby declare that the following is a full, clear, and exact description thereof, reference being had to the accompanying drawings, and to the numerals of reference marked thereon, which form a part of this specification.

This invention relates to a rectifying apparatus for rectifying high tension alternating currents, and the invention has for its object to provide an exceedingly simple, practical and efficient mechanical apparatus capable of safely and economically changing alternating currents of unusual high potential to unidirectional current without loss of energy due to sparking at periods of commutation and having a minimum deterioration of the relatively movable commutator elements. Mechanical rectifying apparatus for this purpose heretofore devised have been practically limited to the rectifying of comparatively low potentials because of the great tendency of sparking between the oppositely polarized members of the rectifying apparatus. Since the width of the air gap across which a spark will jump depends on the difference of potential between the oppositely polarized members of the apparatus, it follows that the higher the potential of the current to be rectified, the greater should be the air gaps between the oppositely polarized members of the rectifying apparatus.

The main or principal feature of my invention is embraced in a construction and arrangement of the relatively rotative commutator elements, to-wit, the collector plates or bars and the commutator members, and the conductors connected therewith, whereby said elements and the conductors of opposite polarity are separated by air gaps of a width proportional to the difference of potential between the oppositely polarized members of the apparatus, in such manner that said width is limited only by the practical peripheral velocity of the rotative member of the apparatus.

Among the practical uses to which my improved alternating current rectifier may be put is found in the production of continuous high potential unidirectional electric discharges for the purpose of precipitating solid mediums suspended in air or other gaseous mediums as a part of a process for reclaiming such solids which may be of value, or for purifying air containing deleterious fumes. Other uses of the rectified high potential direct currents will suggest themselves to those skilled in this and analogous arts.

A practical rectifying apparatus which I have devised, and which is herein shown, consists of two rotative arms made of a light, substantial, non-conducting material, which are held rigidly separated at predetermined angles with respect to each other, and carry at their outer ends commutator members which are adapted for wiping engagement with angularly separated collector plates disposed on the circumference of a circle described by said commutator members, said arms and the commutator members carried thereby rotating in synchronism with the frequency of the alternating current being rectified. The said commutator members carried by the rotating arm may be connected with the source of alternating current to be rectified, while the collector plates may be connected with the work circuit which receives the rectified or unidirectional current. The said collector plates are located at such distance apart on the circumference of the circle described by the commutator members that the said commutator members make simultaneous contact with collector plates of opposite polarity at the instant of effective value of the alternating current waves so that a current of full value is transmitted in a given direction to the work circuit. In the further rotation of said arms the commutator members carried thereby are brought into contact with another consecutive pair of oppositely polarized collector plates. The direction of flow of the alternating current in the said commutator members has, however, undergone a complete change so that current is delivered through said collector plates to the work circuit in the same direction as before. In the continuous rotation of said arms, said commutator members always deliver current of the same sign to the same collector plates, thus transmitting a continuous unidirectional current to the work circuit. It may be observed that, instead of taking the unidirectional current from the collector plates, the operation may be reversed, so that by supplying alternating current to said collector plates, a rectified current may be obtained from the rotating commutator members. It may be furthermore observed that either of the sets of commutator elements may be rotated while the other remains stationary relatively thereto, with the same results so far as is concerned the rectification of the current. As the speed of the rotating member is directly proportional to the frequency of the current to be rectified, it follows that the lower the frequency of the current to be rectified the greater can be made the length of the arms carrying the commutator members without exceeding the limit of practical peripheral speed of said members and the corresponding increase in the air gap between the oppositely polarized points will permit the rectifying of a correspondingly higher pressure current. Moreover, the apparatus is capable of an inverse operation in a manner to supply from the machine an alternating current that is derived from a source supplying a direct current, the arrangement for effecting such reversal being obvious.

Various means may be employed for operating the apparatus in synchronism with the alternating current frequency. For instance, a shaft carrying the rotative arms may constitute an extension of the shaft carrying the rotating member of an alternating current generator. If, on the other hand, the current is to be rectified at a point distant from the generating station, the shaft carrying the rotating arms may be driven by means of a sychronous motor operated from the source of alternating current to be rectified and connected direct to said shaft by means of a sprocket chain, a gear or any other means designed to prevent mechanical slip between the motor and shaft.

In the following description and accompanying drawings is set forth one arrangement of the apparatus suitable for carrying out the invention but it is evident that the invention in its broader aspects is not confined to this particular apparatus as the same results may be obtained by many arrangements of a similar nature.

In the drawings:—Figure 1 is a perspective view of an apparatus embodying my invention. Fig. 2 is a diagrammatic view illustrating electrical equipment and wiring.

In the said drawings, 10 designates a shaft rotatively mounted in a frame 11 made of wood or other insulating material, said frame providing support for either end of the shaft. Said shaft is provided with two collector rings 12 and 13 which are fastened to and rotate with the said shaft. Fixed to the shaft between said collector rings is a disk 14 made of some light weight non-conducting material, as a strong fiber. Formed on said disk and extending at right angles to each other are two arms 15 and 16 which carry at their outer ends current commutator members 18 and 19. The current commutator member 18 is electrically connected to the collector ring 12 by means of a conductor 20 and a similar conductor 21 electrically connects the current commutator member 19 with the collector ring 13. In order to prevent vibration of said arms 15 and 16, such as might tend to shift the commutator members 18 and 19 out of the planes of the arms during the rotation of the shaft, two braces 22 and 23, of some strong, light, non-conducting material are provided, each attached at one end to one of said arms near its outer end and extending diagonally downwardly in a direction away from the conductor attached to said arm and fastened to the shaft. Alternating current is supplied to the commutator members 18 and 19 on the revolving arms 15 and 16 through the medium of two brushes 24 and 25 suitably supported on the frame adjacent to and in wiping engagement with the collector rings 12 and 13. Said brushes are electrically connected to the secondary 26 of a high tension transformer 27, the primary 26$^a$ of which is supplied with current from an alternating current dynamo 28.

An auxiliary frame 29 mounted upon the frame 10 carries four collector plates 30, 31, 32 and 33 of a suitable conducting material, said plates being disposed at four equidistant points on the circumference of the circle described by the conducting members 18 and 19 and concentric with respect to the shaft 11. Said collector plates are located in such position with respect to the plane of rotation of the arms 15 and 16 that the commutator members carried by said arms have wiping engagement with the collector plates during the rotation of the shaft 11. Two of said collector plates 31 and 33, located diametrically opposite to each other are connected by branch conductors 34 with one side 35 of the work circuit and the other oppositely located collector plates 31 and 32 are connected by branch conductors 36 with the other side 37 of the work circuit. The two sides of the work circuit may be connected with any desired high potential direct current apparatus and, as herein shown, are connected with two terminals 38 and 39 which may be the terminals of a high potential discharger.

The shaft 11 carrying the revolving commutator members is shown as rotated at a velocity in synchronism with the frequency of the current to be rectified by means of a synchronous motor 40 which is connected with and receives current from the same source which supplies the current to be rectified. The shaft of said motor is geared to the shaft 11 by means of a sprocket chain 41 which prevents mechanical slip between the shaft 11 and the motor shaft.

The operation of the apparatus described is as follows: By means of the synchronous motor 40, the shaft 11, carrying the revolving commutator members, is rotated at a velocity in synchronism with the frequency of the alternating current supplied from the dynamo 28, and said commutator members are brought into wiping engagement successively with the collector plates. The said commutator members are thus brought into simultaneous contact with a pair of adjacent collector plates of opposite polarity and such contact occurs during the effective value in each commutator member of an alternating current wave of a given sign. At this instant a positive current is transmitted through one of the commutator members and one of the collector plates to the work circuit, the other engaged collector plate being in contact with the negative side of the alternating current circuit. In the further angular displacement of the commutator members they are brought into engagement with another pair of adjacent collector plates of opposite polarity, one of which was a plate of the former pair. In the meantime the alternating current has undergone a complete change of direction so that the commutator member which before delivered positive current now delivers negative current. From the foregoing it will be apparent that the direction of the alternating current is reversed during each quarter revolution of the commutator members and that the diametrically opposite plates always collect currents of the same polarity so as to deliver a continuous unidirectional current to the exterior or work circuit.

It is apparent that the construction described provides means for insulating the commutator elements and the conductors connected therewith by air gaps of such width as to permit the rectification of alternating currents of extremely high potential, the width of the air gaps affording such insulation being only limited by the practical maximum velocity of the rotative members of the apparatus. That is to say, the angular separation of commutator elements of opposite polarity results in an increasing diameter of the rotative member of the apparatus and the construction described permits of any desired diameter of such rotative part and corresponding widening of the air gaps between commutator elements of opposite polarities up to the limit of peripheral speed of said rotative member of the apparatus.

I claim as my invention:—

1. A high potential alternating current rectifying apparatus comprising a plurality of rotative angularly separated, elongated, relatively light, thin arms made of non-conducting material and provided with means for bracing them from flexure out of the plane of rotation thereof and revolving at a speed in synchronism with the frequency of the alternating current to be rectified, commutator members located at the outer ends of said arms and connected with a source supplying alternating current, and a plurality of angularly separated collector plates arranged on the circumference of a circle described by said commutator members and with which the said commutator members are adapted for wiping contact, said collector plates collecting from the commutator members opposite polarities of a unidirectional current.

2. An alternating current rectifying apparatus comprising a rotative shaft, a plurality of light, angularly separated arms made of non-conducting material fixed radially to and revolving with said shaft, commutator members carried by the outer ends of said arms and connected with a source supplying alternating current, means for preventing flexure of said arms out of their plane of rotation, and a plurality of collector plates with which said commutator members have wiping contact, consecutive ones of which collect opposite polarities of a unidirectional current from said commutator members.

3. An alternating current rectifying apparatus comprising a rotative shaft, two elongated angularly separated arms fixed radially to the shaft and made of a non-conducting material, said arms carrying at their outer ends commutator members, collector rings fixed to the shaft at either side of said arms, said collector rings being in electrical commutation with brushes connected to a source supplying alternating current, conductors electrically connecting the said collector rings with the commutator members, and arranged to brace said arms from flexure, each in one direction, braces connected with said arms and said shaft for bracing the arms, each from flexure in the opposite direction, and a plurality of collector plates arranged on the circumference of a circle described by the commutator members, said plates being adapted for wiping contact by said commutators and arranged to collect a unidirectional current therefrom.

4. An alternating current rectifying apparatus comprising a rotative shaft provided with angularly separated arms revolving with the said shaft, commutator members carried by the outer ends of the said arms, means for supplying alternating current to said commutator members, means for maintaining said commutator members in their plane of rotation, collector plates separated by wide air gaps with which said commutator members have wiping contact and arranged to collect a unidirectional current therefrom, and means for revolving said commutator members at a speed in synchronism with the frequency of the current to be rectified and to make contact with consecutive collector plates during the interval that the effective value of the alternating current waves are passing through the respective commutator members.

5. The combination with a rotative shaft, elongated arms of non-conducting material carried by and rotating with said shaft, and provided at their outer ends with conductor members, said arms being relatively light and being thin in the plane of their rotation, a frame of insulating material, angularly separated collector plates supported on said frame and arranged in the circumference of a circle described by the conductor members carried by said arms and with which said conductors have wiping contact, collector rings carried by said shaft and electrically connected with the conductor members on said arms and means for bracing the arms to hold them in the plane of rotation thereof.

In testimony, that I claim the foregoing as my invention I affix my signature in the presence of two witnesses, this 30th day of Sept. A. D. 1908.

CHESTER H. THORDARSON.

Witnesses:
 WILLIAM L. HALL,
 GEORGE R. WILKINS.